United States Patent
Inagaki et al.

(10) Patent No.: US 9,012,548 B2
(45) Date of Patent: Apr. 21, 2015

(54) POLYPROPYLENE RESIN COMPOSITION, POLYOLEFIN RESIN COMPOSITION CONTAINING POLYPROPYLENE RESIN COMPOSITION, AND MOLDED ARTICLE OF POLYOLEFIN RESIN COMPOSITION

(75) Inventors: Keisuke Inagaki, Osaka (JP); Kimio Yoshikawa, Osaka (JP)

(73) Assignee: Riken Vitamin Co., Ltd, Tokyo (JP)

( * ) Notice: Subject to any disclaimer, the term of this patent is extended or adjusted under 35 U.S.C. 154(b) by 0 days.

(21) Appl. No.: 13/261,805

(22) PCT Filed: Jul. 10, 2012

(86) PCT No.: PCT/JP2012/067533
§ 371 (c)(1),
(2), (4) Date: May 21, 2014

(87) PCT Pub. No.: WO2013/018511
PCT Pub. Date: Feb. 7, 2013

(65) Prior Publication Data
US 2014/0249259 A1     Sep. 4, 2014

(30) Foreign Application Priority Data
Aug. 1, 2011  (JP) .................................. 2011-168054

(51) Int. Cl.
| | | |
|---|---|---|
| *C08K 5/24* | (2006.01) | |
| *C08L 23/12* | (2006.01) | |
| *C08F 255/02* | (2006.01) | |
| *C08L 23/10* | (2006.01) | |
| C08K 5/14 | (2006.01) | |
| C08G 77/20 | (2006.01) | |

(52) U.S. Cl.
CPC ............... *C08L 23/12* (2013.01); *C08F 255/02* (2013.01); C08K 5/14 (2013.01); *C08L 23/10* (2013.01); C08G 77/20 (2013.01)

(58) Field of Classification Search
CPC ........................................................ C08L 23/12
USPC ........................................................ 524/261
See application file for complete search history.

(56) References Cited

U.S. PATENT DOCUMENTS 4,957,949 A * 9/1990 Kamada et al. ............... 523/201
2009/0042043 A1 * 2/2009 Joseph et al. .................. 428/447

FOREIGN PATENT DOCUMENTS

JP          06016824 A  *  1/1994  ................. C08J 5/00

OTHER PUBLICATIONS

Translation of JP 06-016824, Jan. 25, 1994.*

* cited by examiner

*Primary Examiner* — Hui Chin
(74) *Attorney, Agent, or Firm* — Roylance, Abrams, Berdo and Goodman LLP

(57) ABSTRACT

An object of the present invention is to provide a polypropylene resin composition that is blended in a polyolefin resin to improve its surface characteristics and impart sustained water repellency and yet is low in aggregates so as not to deteriorate the visual appearance, a polyolefin resin composition containing the polypropylene resin composition, and a molded article of the polyolefin resin composition. A composition that achieves the object is a polypropylene resin composition obtained by heating and kneading a material containing (A) a polypropylene resin, (B) a polypropylene wax, (C) a polyorganosiloxane containing at least one silicon-atom-bonded alkenyl group in each molecule, and (D) an organic peroxide.

3 Claims, No Drawings

POLYPROPYLENE RESIN COMPOSITION, POLYOLEFIN RESIN COMPOSITION CONTAINING POLYPROPYLENE RESIN COMPOSITION, AND MOLDED ARTICLE OF POLYOLEFIN RESIN COMPOSITION

FIELD OF THE ART

The present invention relates to a polypropylene resin composition with sustained water repellency, a polyolefin resin composition containing the polypropylene resin composition, and a molded article of the polyolefin resin composition. Specifically, the present invention relates to a polypropylene resin composition that is blended in a polyolefin resin to improve its surface characteristics and impart sustained water repellency and yet is low in aggregates so as not to deteriorate the visual appearance, a polyolefin resin composition containing the polypropylene resin composition, and a molded article of the polyolefin resin composition.

BACKGROUND AND DESCRIPTION OF RELATED ART

Currently, polyolefin resins are used widely in various fields, such as automobiles, household electric appliances, stationery, films, food containers, etc. However, functions suited for the respective usages cannot be obtained with polyolefin resins alone and therefore various additives are blended.

Conventionally, as methods of improving surface characteristics, such as water repellency, lubricating property, mold release property, etc., of polyolefin resins, methods of kneading a substance having a surface characteristic improving effect, such as a silicone compound, etc., into a polyolefin resin, methods of coating such a substance on a surface of a polyolefin resin, etc., have been carried out. Among such methods, kneading methods are used industrially due to being simple and not increasing manufacturing processes and being high in the effect of improving the surface characteristics of polyolefin resins. However, in cases of simply kneading a silicone compound or other substance having a surface characteristic improving effect as it is into a polyolefin resin, it may be difficult to perform uniform kneading at times and further, bleed-out may occur and preclude the maintenance of sustained water repellency. Surface modifiers, which are polypropylene resin compositions with water repellency that are obtained by bonding a polypropylene resin, having compatibility with polyolefin resins, and a silicone compound or other substance having a surface characteristic improving effect, have thus been developed.

As conventional arts related to a polypropylene resin composition (surface modifier) with water repellency that is obtained by bonding a polypropylene resin and a silicone compound, a method for manufacturing a polypropylene resin molded article by melting and kneading a composition made up of polypropylene, an organopolysiloxane having a vinyl group, and an organic peroxide and thereafter performing molding (see Patent Document 1), a method for manufacturing a polypropylene resin composition by heating and kneading a polypropylene resin and a polyorganosiloxane, containing at least one silicon-atom-bonded alkenyl group in each molecule, without the presence of a radical forming catalyst, to chemically bond the polyorganosiloxane to the polypropylene resin and then performing heating and kneading upon adding an antioxidant (see Patent Document 2), etc., have been disclosed.

However, with the method of Patent Document 1, chemical bonding between the polypropylene and the organopolysiloxane having a vinyl group does not progress uniformly because these two components are not readily miscible with each other, and there is a problem in that portions of the organopolysiloxane bond chemically to each other to form aggregates that deteriorate the appearance. A surface modifier that is a more preferable polypropylene resin was thus desired.

Patent documents are as se bellow.
[Patent Document 1] Japan Patent No. 2516283
[Patent Document 2] Japan Patent No. 3597578

SUMMARY OF THE INVENTION

Problems to be Solved by the Invention

An object of the present invention is to provide a polypropylene resin composition that is blended in a polyolefin resin to improve its surface characteristics and impart sustained water repellency and yet is low in aggregates so as not to deteriorate the visual appearance, a polyolefin resin composition containing the polypropylene resin composition, and a molded article of the polyolefin resin composition.

Means for Solving the Problems

As a result of repeating diligent research toward achieving the above object, the present inventors found that the object can be achieved by using a polypropylene wax in combination with a polypropylene resin in a polypropylene resin composition that uses a polyorganosiloxane, containing at least one silicon-atom-bonded alkenyl group in each molecule, and an organic peroxide. The present inventors carried out further research based on these findings and arrived at completing the present invention.

That is, the present invention that achieves the above object has the following arrangement.

(1) A polypropylene resin composition obtained by heating and kneading a material containing (A) a polypropylene resin, (B) a polypropylene wax, (C) a polyorganosiloxane containing at least one silicon-atom-bonded alkenyl group in each molecule, and (D) an organic peroxide.

(2) A polyolefin resin composition containing the polypropylene resin composition according to the above (1).

(3) A molded article obtained by molding the polyolefin resin composition according to the above (2).

Effects of the present invention are as follows.

The polypropylene resin composition according to the present invention has a function of a surface modifier, improves surface characteristics and imparts sustained water repellency, lubricating property, and mold release property to a polyolefin resin composition upon being added to the polyolefin resin composition, and is low in aggregates and can thus provide a polyolefin resin composition and a molded article thereof of fine appearance.

MODE(S) FOR CARRYING OUT THE INVENTION

A polypropylene resin (may also be referred to hereinafter as the "(A) component"), which is the (A) component used in the present invention, is a resin made up of a homopolymer of propylene, a block copolymer, random copolymer, graft copolymer, or other copolymer of propylene and an a-olefin other than propylene, such as ethylene, butene-1, etc., or a mixture of the above.

A polypropylene wax (may also be referred to hereinafter as the "(B) component"), which is the (B) component used in the present invention, is obtained by polymerizing propylene or depolymerizing a general, high molecular weight polypropylene. The polypropylene wax is preferably a low molecular weight polypropylene with a number average molecular weight of approximately 1000 to 20000.

Examples of such a (B) component that are commercially manufactured and marketed include Viscol 330-P, Viscol 440-P, Viscol 550-P, and Viscol 660-P (all trade names of products made by Sanyo Chemical Industries, Ltd.), Hi-Wax NP055, Hi-Wax NP105, Hi-Wax NP505, and Hi-Wax NP805(all trade names of products made by Mitsui Chemicals, Inc.), Licowax PP230 (trade name of product made by Clariant, Ltd.), etc., and these can be used in the present invention.

A polyorganosiloxane containing at least one silicon-atom-bonded alkenyl group in each molecule (may also be referred to hereinafter as the "(C) component"), which is the (C) component used in the present invention, is a polyorganosiloxane, with which one or more alkenyl groups is or are bonded to a silicon atom or silicon atoms in the polyorganosiloxane. The polyorganosiloxane backbone may be linear, branched, or cyclic or may be a mixture of these. As examples of types of polyorganosiloxane, both-end dimethylvinylsiloxy-blocked polydimethylsiloxane, both-end dimethylvinylsiloxy-blocked dimethylsiloxane-methylsiloxane copolymer, both-end trimethylsiloxy-blocked polymethylvinylsiloxane, both-end trimethylsiloxy-blocked dimethylsiloxane-methylvinylsiloxane copolymer, both-end dimethylhexenylsiloxy-blocked polydimethylsiloxane, both-end dimethylhexenylsiloxy-blocked dimethylsiloxane-methylhexenylsiloxane copolymer, both-end trimethylsiloxy-blocked polymethylhexenylsiloxane, both-end trimethylsiloxy-blocked dimethylsiloxane-methylhexenylsiloxane copolymer, etc., can be cited.

As the alkenyl group bonded to the silicon atom, the vinyl group, propenyl group, butenyl group, pentenyl group, hexenyl group, decenyl group, etc., can be cited. As an organic group, other than an alkenyl group, that is bonded to the silicon atom, an alkyl group, such as the methyl group, ethyl group, propyl group, 3,3,3-trifluoropropyl group, 3-chloropropyl group, etc., a cycloalkyl group, such as the cyclopentyl group, cyclohexyl group, etc., an aryl group, such as the phenyl group, xylyl group, etc., an aralkyl group, such as the benzyl group, phenethyl group, 3-phenylpropyl group, etc., an alkoxy group, such as the methoxy group, ethoxy group, propoxy group, etc., the hydroxy group, etc., can be cited.

Although the (C) component includes those of various kinematic viscosities and any of these may be used, that having a kinematic viscosity at 25° C. of approximately 200 to 1 million mm²/s is preferable and that having a kinematic viscosity at 25° C. of approximately 500 to 1 million mm²/s is more preferable. When the component with a kinematic viscosity outside the above range is used, it may be difficult for the effects of the present invention to be exhibited in some cases and the component may also be unsuitable in terms of processing of the surface modifier that is the polypropylene resin composition according to the present invention in some cases.

An organic peroxide (may also be referred to hereinafter as the "(D) component"), which is the (D) component used in the present invention, forms a radical upon being heated to make the (C) component undergo chemical bonding with the (A) component or the (B) component. As specific examples, a ketone peroxide, such as methyl ethyl ketone peroxide, methyl isobutyl ketone peroxide, cyclohexanone peroxide, etc., a diacyl peroxide, such as isobutyryl peroxide, lauroyl peroxide, benzoyl peroxide, etc., a hydroperoxide, such as diisopropylbenzene hydroperoxide, etc., a dialkyl peroxide, such as dicumyl peroxide, 2,5-dimethyl-2,5-di-(t-butylperoxy)hexane, 1,3-bis-(t-butylperoxy-isopropyl)-benzene, di-t-butyl peroxide, 2,5-dimethyl-2,5-di-(t-butylperoxy)-hexane-3, etc., a peroxyketal, such as 1,1-di-t-butylperoxy-3,3,5-trimethylcyclohexane, 2,2-di-(t-butylperoxy)-butane, etc., an alkyl perester, such as t-butyl peroxypivalate, t-butyl peroxybenzoate, etc., a percarbonate, such as t-butyl peroxyisopropyl carbonate, etc., can be cited.

As the (D) component, Luperox 101, Luperox DC, Luperox F, Luperox DI (all trade names of products made by Arkema Yoshitomi, Ltd.), etc., are commercially manufactured and marketed and these may be used in the present invention.

A polypropylene resin composition according to the present invention (may also be referred to hereinafter simply as the "surface modifier according to the present invention") is obtained by heating and kneading a material containing the polypropylene resin that is the (A) component, the polypropylene wax that is the (B) component, the polyorganosiloxane containing at least one silicon-atom-bonded alkenyl group in each molecule that is the (C) component, and the organic peroxide that is the (D) component to chemically bond (graft) the (C) component with the (A) component and the (B) component by the alkenyl group in the (C) component.

As the method for performing the heating and kneading, a known kneading machine may be used and, for example, a Banbury mixer, kneader, single-screw extruder, twin-screw extruder, etc., may be used. Among these, a twin-screw extruder is favorable in consideration of productivity, kneading force, etc. Twin-screw extruders including non-intermeshed counter-rotation twin screw extruders, intermeshed counter-rotation twin screw extruders, non-intermeshed co-rotation twin screw extruders, and intermeshed co-rotation twin screw extruders, etc., and although any of these may be used, use of an intermeshed co-rotation twin screw extruder is preferable for improving the dispersion properties of the (A) component, (B) component, and (C) component and suppressing the progress of localized reactions.

In regard to the heating temperature while kneading, the temperature suffices to be in a range of no less than the temperature at which the polypropylene resin melts and in which the resin does not degrade excessively, and a specific example of such a range is 160° C. to 250° C. Although the time for heating and kneading differs according to the kneading machine used, heating conditions, etc., for example in a case of using a twin-screw extruder as the kneading machine, the time is preferably approximately 30 seconds to 10 minute and more preferably 1 to 5 minutes.

In regard to the blend ratio (weight ratio) of the polypropylene resin that is the (A) component and the polypropylene wax that is the (B) component used in the surface modifier according to the present invention, the (A) component:(B) component is preferably approximately 99:1 to 40:60, more preferably approximately 90:10 to 45:55, and even more preferably approximately 80:20 to 50:50. At a blend ratio besides the above, it may be difficult to obtain the effects of the present invention in some cases.

With respect to 100 parts by mass of the (A) component and the (B) component combined, the blending amount of the polyorganosiloxane containing at least one silicon-atom-bonded alkenyl group in each molecule that is the (C) component used in the surface modifier according to the present invention is preferably approximately 0.5 to 200 parts by mass, more preferably approximately 2 to 150 parts by mass, and even more preferably approximately 10 to 100 parts by mass. When the blending amount of the C component is outside the above ranges, it may be difficult to obtain the effects of the present invention in some cases.

With respect to 100 parts by mass of the (A) component and the (B) component combined, the blending amount of the organic peroxide that is the (D) component used in the surface modifier according to the present invention is preferably approximately 0.01 to 3.0 parts by mass and more preferably approximately 0.05 to 3.0 parts by mass.

The surface modifier according to the present invention may have blended therein any of various additives, which are ordinarily added to polypropylene resins, within ranges in which the present invention is not inhibited. For example, any of various additives, such as surface modifiers (water repellents, lubricants, mold release agents, etc.) besides the surface modifier according to the present invention, heat stabilizers, antioxidants, fillers, colorants, antistatic agents, antifogging agents, neutralizers, anti-weathering agents, ultraviolet absorbers, flame retardants, anti-blocking agents, impact resistance improvers, etc., may be blended. There is no restriction in particular in the timing of blending of the various additives and addition may be performed before heating and kneading, during heating and kneading, or after heating and kneading.

As surface modifiers besides the surface modifier according to the present invention, non-reactive silicone oils can be cited, with specific examples including polydimethylsiloxane, polymethylphenylsiloxane, polyether modified polydimethylsiloxane, alkyl modified polydimethylsiloxane, higher fatty acid modified polydimethylsiloxane, fluorine modified polydimethylsiloxane, etc.

The thus obtained surface modifier according to the present invention itself improves surface characteristics, has sustained water repellency, is low in aggregates, and may therefore be used as it is as a polypropylene resin composition molded article.

The surface modifier according to the present invention may be used by blending in a polyolefin resin. By blending in the surface modifier according to the present invention, the surface characteristics of the polyolefin resin composition can be improved, sustained water repellency can be imparted, and further, lubricating property and mold release property can be imparted without greatly changing the physical properties of the resin composition. Also, the amount of aggregates is low and therefore a polyolefin resin composition and a molded article thereof of extremely fine appearance can be obtained.

As the polyolefin resin, a homopolymer of an α-olefin, such as ethylene, propylene, 1-butene, 1-pentene, 1-hexene, 4-methyl-1-pentene, etc., a mutual copolymer of the aforementioned α-olefins, a copolymer of an aforementioned α-olefin and a monomer besides an α-olefin that is copolymerizable with an aforementioned α-olefin, mixtures of the above, etc., can be cited. As a monomer besides an α-olefin that is copolymerizable with an aforementioned α-olefin, vinyl acetate, maleic acid, vinyl alcohol, methacrylic acid, methyl methacrylate, ethyl methacrylate, etc., can be cited.

The blending amount of the surface modifier according to the present invention with respect to the polyolefin resin is set so that the amount of the (C) component in the surface modifier according to the present invention with respect to 100 parts by mass of the polyolefin resin is preferably approximately 1 to 10 parts by mass and more preferably approximately 2 to 5 parts by mass.

A polyolefin resin composition is obtained by mixing the polyolefin resin and the surface modifier according to the present invention while heating. The polyolefin resin composition thus obtained may be used as a molded article of any shape upon being subject to any of various molding means, such as extrusion molding, injection molding, compression molding, sheet molding, etc. In regard to usage, the molded articles are widely used in wire coverings, agricultural materials, such as greenhouses, tunnels, etc., sundries and daily commodities, such as toys, stationery, etc., building materials, such as wallpaper, etc., household electric appliances, automobiles, etc.

Although the present invention shall now be described by way of examples, these examples simply illustrate the effects of the present invention and do not restrict the present invention.

EXAMPLES

Examples 1 to 6 and Comparative Examples 1 to 8

<Preparation of Polypropylene Resin Compositions (Surface Modifiers)>
(1) Raw Materials
(A) component: The following were used as polypropylene resins.
A-1: Prime Polypro J-105G (trade name; made by Prime Polymer Co., Ltd., homo-PP, MI=9)
A-2: Wintec WFX4T (trade name; made by Japan Polypropylene Corp., metallocene catalyzed random PP, MI=7)
(B) component: The following was used as the polypropylene wax.
B-1: Viscol 330-P (trade name; made by Sanyo Chemical Industries, Ltd., molecular weight: 15,000)
(C) component: The following was used as the polyorganosiloxane containing at least one silicon-atom-bonded alkenyl group in each molecule.
C-1: XF40A-1987 (trade name; made by Momentive Performance Materials Japan Inc., kinematic viscosity: 1500 mm$^2$/s, both-end dimethylvinylsiloxy-blocked polydimethylsiloxane)
(D) component: The following was used as the organic peroxide.
D-1: Luperox 101 (trade name; Arkema Yoshitomi, Ltd., 2,5-dimethyl-2,5-di-(t-butylperoxy)hexane)
(2) Blending of Surface Modifiers
The blending amounts of the surface modifiers prepared using the above raw materials are shown in Table 1 and Table 2.

TABLE 1

| Raw | Example | | | | | |
| material | 1 | 2 | 3 | 4 | 5 | 6 |
| A-1 | 75.0 | — | — | 75.0 | — | — |
| A-2 | — | 75.0 | 50.0 | — | 75.0 | 50.0 |
| B-1 | 25.0 | 25.0 | 50.0 | 25.0 | 25.0 | 50.0 |
| C-1 | 100.0 | 100.0 | 100.0 | 50.0 | 50.0 | 50.0 |
| D-1 | 0.8 | 0.8 | 0.8 | 0.8 | 0.8 | 0.8 |

The numerical values in the table are masses (g).

TABLE 2

| Raw | Comparative Example | | | | | | | |
| material | 1 | 2 | 3 | 4 | 5 | 6 | 7 | 8 |
| A-1 | 100.0 | — | 100.0 | 75.0 | 75.0 | 100.0 | 75.0 | 90.0 |
| A-2 | — | 100.0 | — | — | — | — | — | — |

TABLE 2-continued

| Raw | Comparative Example | | | | | | | |
|---|---|---|---|---|---|---|---|---|
| material | 1 | 2 | 3 | 4 | 5 | 6 | 7 | 8 |
| B-1 | — | — | — | 25.0 | 25.0 | — | 25.0 | — |
| B-2 (Note 1) | — | — | — | — | — | — | — | 10.0 |
| C-1 | 100.0 | 100.0 | 50.0 | — | 10.0 | 10.0 | — | 50.0 |
| C-2 (Note 2) | — | — | — | — | — | — | 10.0 | — |
| D-1 | 0.8 | 0.8 | 0.8 | 0.8 | — | — | 0.8 | 0.8 |

The numerical values in the table are masses (g).

Note 1: The following was used as a wax differing from the (B) component.

B-2 (trade name:, Slipacks E; made by Nippon Kasei Chemical Co., Ltd., ethylene-bis-stearamide, amide wax)

Note 2: The following was used as a polyorganosiloxane (polyorganosiloxane not containing a silicon-atom-bonded alkenyl group) differing from the (C) component.

C-2 (trade name: TSF451-1000; made by Momentive Performance Materials Japan Inc., kinematic viscosity: 1500 mm²/s)

(3) Preparation of Surface Modifiers

Using raw materials of five times the blend amounts indicated in Table 1 and Table 2 and an intermeshed co-rotation twin screw extruder (Model: MFU15TW-45MG-NH; made by Technovel Corp., screw diameter=15 mm, L/D=45), surface modifiers were prepared by the following method.

The (A) component, (B) component, and (D) component were added from a raw material charging port of the intermeshed co-rotation twin screw extruder with the temperatures of barrels (C1 to C6, H/D) being set to 80 to 200° C. (C1=80° C., C2=160° C., C3 to C6=200° C., H/D=200° C.) and the screw rotation speed set to 600 rpm and the (C) component was added from the C2 barrel using a liquid adding apparatus to prepare the surface modifiers (Example Products 1 to 6 and Comparative Example Products 1 to 8).

The degree (graft efficiency) to which the (C) component added to the surface modifier bonded chemically (grafted) with the (A) component and the (B) component at this point was measured by the following method.

After heating and dissolving approximately 1 g of the obtained surface modifier in 100 mL of xylene, 50 mL of hexane and 50 mL of methanol were added to precipitate the (A) component and the (B) component that were chemically bonded or were not chemically bonded to the (C) component, the (C) component not chemically bonded to the (A) component and the (B) component was removed by filtration, and the precipitate was separated and thereafter dried.

Infrared spectra of the dried precipitate and the surface modifier were respectively measured by FT-IR (model: NICOLET 380; made by Thermo Fisher Scientific Inc.) equipped with an ATR (model: Smart Orbit; made by Thermo Fisher Scientific Inc.), the absorbance ratio [absorbance of the (C) component/absorbance of the (A) component and the (B) component] of the absorption peak (1256 cm⁻¹) due to the (C) component and the absorption peak (1376 cm⁻¹) due to the (A) component and the (B) component was determined, and the graft efficiency was calculated by the formula indicated below. The graft efficiencies are shown in Table 3.

Graft efficiency (%)=(absorbance ratio of the dried precipitate/absorbance ratio of the surface modifier)×100

<Preparation of Polyolefin Resin Composition Molded Articles>

To evaluate the sustained water repellency and appearance of the respective surface modifiers obtained (Example Products 1 to 6 and Comparative Example Products 1 to 8), polyolefin resin composition molded articles were prepared by the following method.

The surface modifier obtained (Example Products 1 to 6 and Comparative Example Products 1 to 8) was added to a polyolefin resin (trade name: J-105G; made by Japan Polypropylene Corp., homo-PP, MI=9) so that the concentration of the (C) component with respect to 100 parts by mass of the polyolefin resin was 2 parts by mass, and using an injection molding machine (model: IS-55EPN, made by Toshiba Corp.), injection molding at a barrel temperature of 220° C. and a mold temperature of 40° C. was performed to prepare a flat plate (80 mm×100 mm×2 mm) polyolefin resin composition molded article (Trial Products 1 to 14).

Also, as a control product, the same operations, with the exception of not adding the surface additive, were performed to prepare a polyolefin resin composition molded article (Trial Product 15).

<Evaluation of Appearance and Sustained Water Repellency>

(1) Evaluation of Appearance

Each of the polyolefin resin composition molded articles obtained (Trial Products 1 to 15) was observed under 50 times magnification using a microscope (model: VHX-9000; made by Keyence Corp.) and the number of aggregates of no less than 200 μm size that were present in a range of 80 mm×100 mm was counted. The number of aggregates was coded in accordance with the evaluation standards shown below. For practical use, the appearance may be evaluated as being fine in the code range of Δ to ⊚. The results are shown in Table 3.

15 or more aggregates: "××" The number of aggregates is extremely high and the appearance is dirty.

10 to 14 aggregates: "×" The number of aggregates is high and the appearance is somewhat dirty.

5 to 9 aggregates: "Δ" The number of aggregates is few and the appearance is fine.

2 to 4 aggregates: "○" There are hardly any aggregates and the appearance is extremely fine.

0 to 1 aggregate: "⊚" There are no aggregates at all and the appearance is extremely fine.

(2) Evaluation of Sustained Water Repellency

In regard to the water repellency, the contact angle of the surface of each of the polyolefin resin composition molded articles obtained (Trial Products 1 to 15) was measured using a contact angle gauge (model: CA-X; made by Kyowa Interface Science Co., Ltd.), and the water repellency effect was evaluated by comparison with the polyolefin resin composition molded article (Trial Product 15) without the surface modifier added. Here, in regard to the water repellency, a higher numerical value of the contact angle indicates a better water repellency.

Also in regard to the sustained water repellency, the contact angles before a washing operation and after a washing operation were measured and the numerical values were compared for evaluation. Here, in regard to the sustained water repellency, it is indicated that sustained water repellency is provided if there is no difference between the contact angles before the washing operation and after the washing operation.

As the washing operation, an operation of wiping the surface of each of the polyolefin resin composition molded articles (Trial Products 1 to 15) with absorbent cotton soaked with methyl ethyl ketone was performed ten times. The results are shown in Table 3.

TABLE 3

| Polyolefin resin composition molded article | Added water repellent Name | Graft efficiency | Blending amount (%) | Appearance | Contact angle (°) Before washing | After washing |
|---|---|---|---|---|---|---|
| Trial Product 1 | Example Product 1 | 90 | 4 | Δ | 104 | 104 |
| Trial Product 2 | Example Product 2 | 85 | 4 | Δ | 104 | 104 |
| Trial Product 3 | Example Product 3 | 88 | 4 | ○ | 104 | 104 |
| Trial Product 4 | Example Product 4 | 97 | 6 | ○ | 102 | 102 |
| Trial Product 5 | Example Product 5 | 92 | 6 | ○ | 102 | 102 |
| Trial Product 6 | Example Product 6 | 94 | 6 | ◎ | 102 | 102 |
| Trial Product 7 | Comparative Example Product 1 | 92 | 4 | xx | 104 | 104 |
| Trial Product 8 | Comparative Example Product 2 | 91 | 4 | xx | 104 | 104 |
| Trial Product 9 | Comparative Example Product 3 | 97 | 6 | x | 102 | 102 |
| Trial Product 10 | Comparative Example Product 4 | — | 6 | ◎ | 98 | 98 |
| Trial Product 11 | Comparative Example Product 5 | 0 | 20 | ◎ | 104 | 98 |
| Trial Product 12 | Comparative Example Product 6 | 0 | 20 | ◎ | 104 | 98 |
| Trial Product 13 | Comparative Example Product 7 | 0 | 20 | ◎ | 104 | 98 |
| Trial Product 14 | Comparative Example Product 8 | 93 | 6 | x | 94 | 102 |
| Trial Product 15 | Not added | — | — | ◎ | 98 | 98 |

The results show that the polyolefin resin composition molded articles using the example products have sustained water repellency and the appearances thereof were fine.

With Trial Products 7 to 9 and 14 using the comparative example products, there were many aggregates and the appearances were dirty. Trial Product 10 using the comparative example product did not have water repellency. Trial Products 11 to 13 using the comparative example products did not have sustained water repellency.

What is claimed is:

1. A polypropylene resin composition obtained by heating and kneading a material containing (A) a polypropylene resin, (B) a polypropylene wax, (C) a polyorganosiloxane containing at least one silicon-atom-bonded alkenyl group in each molecule, and (D) an organic peroxide, the polyorganosiloxane being chemically bonded and grafted to the polypropylene resin and to the polypropylene wax.

2. A polyolefin resin composition containing the polypropylene resin composition according to claim 1.

3. A molded article obtained by molding the polyolefin resin composition according to claim 2.

* * * * *